(12) United States Patent
Carlisle

(10) Patent No.: US 9,643,785 B2
(45) Date of Patent: May 9, 2017

(54) BUNCH PRESENTATION

(71) Applicant: NCR Corporation, Duluth, GA (US)

(72) Inventor: Margaret Katherine Carlisle, Dundee (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/753,026

(22) Filed: Jan. 29, 2013

(65) Prior Publication Data
US 2014/0209435 A1 Jul. 31, 2014

(51) Int. Cl.
B65G 15/14 (2006.01)
G07F 19/00 (2006.01)

(52) U.S. Cl.
CPC .............. *B65G 15/14* (2013.01); *G07F 19/20* (2013.01); *G07F 19/203* (2013.01)

(58) Field of Classification Search
CPC ..................................................... G07F 19/203
USPC .................. 198/604; 271/269, 271; 221/279; 902/17
See application file for complete search history.

(56) References Cited

U.S. PATENT DOCUMENTS

| 3,957,173 | A | * | 5/1976 | Roudebush | 221/15 |
|---|---|---|---|---|---|
| 4,342,325 | A | * | 8/1982 | Lundblad | 221/7 |
| 4,795,889 | A | * | 1/1989 | Matuura | G07D 11/0054 209/534 |
| 4,962,919 | A | * | 10/1990 | Azuchi et al. | 271/3.01 |
| 5,342,165 | A | * | 8/1994 | Graef et al. | 414/788.9 |
| 6,978,928 | B2 | * | 12/2005 | Shibata et al. | 235/381 |
| 7,240,829 | B2 | * | 7/2007 | Graef et al. | 235/379 |
| 7,708,192 | B2 | * | 5/2010 | Yokoi et al. | 235/379 |
| 7,870,997 | B2 | * | 1/2011 | Eastman et al. | 235/379 |
| 2012/0193190 | A1 | * | 8/2012 | Yokote et al. | 198/418 |

* cited by examiner

*Primary Examiner* — William R Harp
(74) *Attorney, Agent, or Firm* — Schwegman, Lundberg & Woessner

(57) ABSTRACT

The present invention provides a method and apparatus for presenting at least one item of media to a user from a media recycler module. The media recycler module may be included in a Self-Service Terminal (SST). The media recycler module comprises a pocket interface for presenting media items to a user, and a moveable member operable to move media items located within the pocket interface towards an opening of the pocket interface, thereby enabling a user to retrieve the media items within the pocket interface.

12 Claims, 5 Drawing Sheets

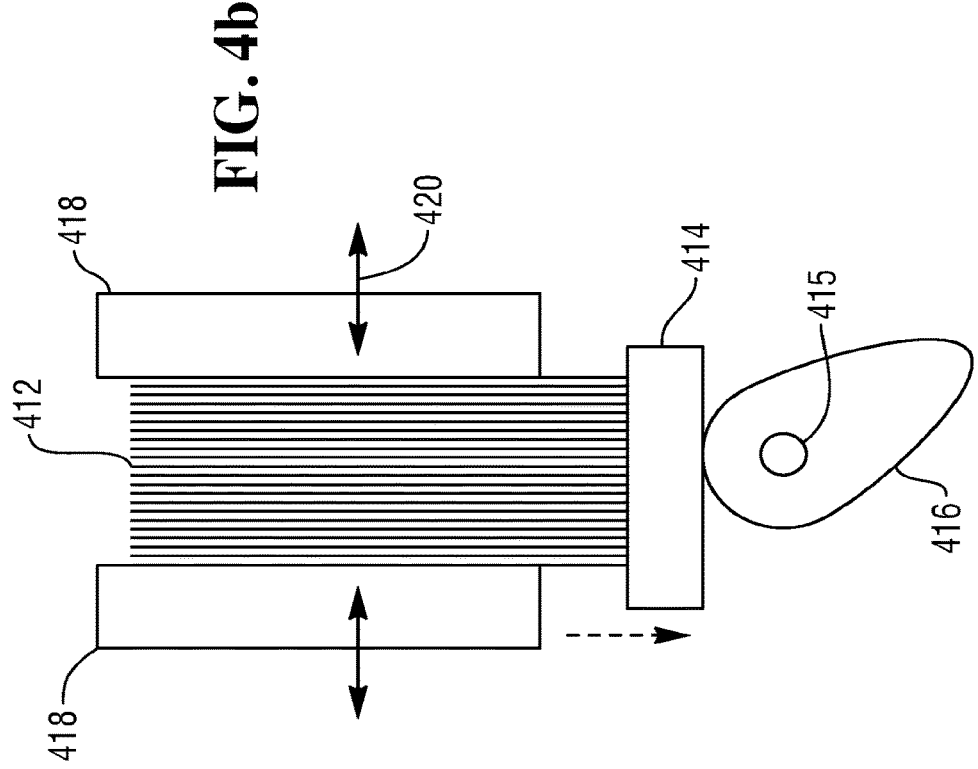
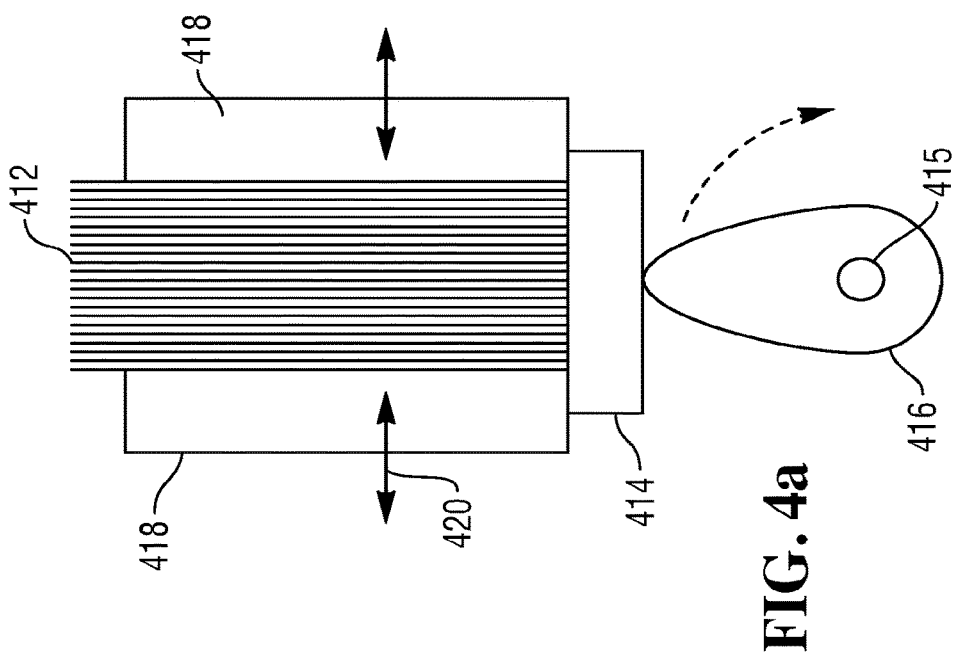

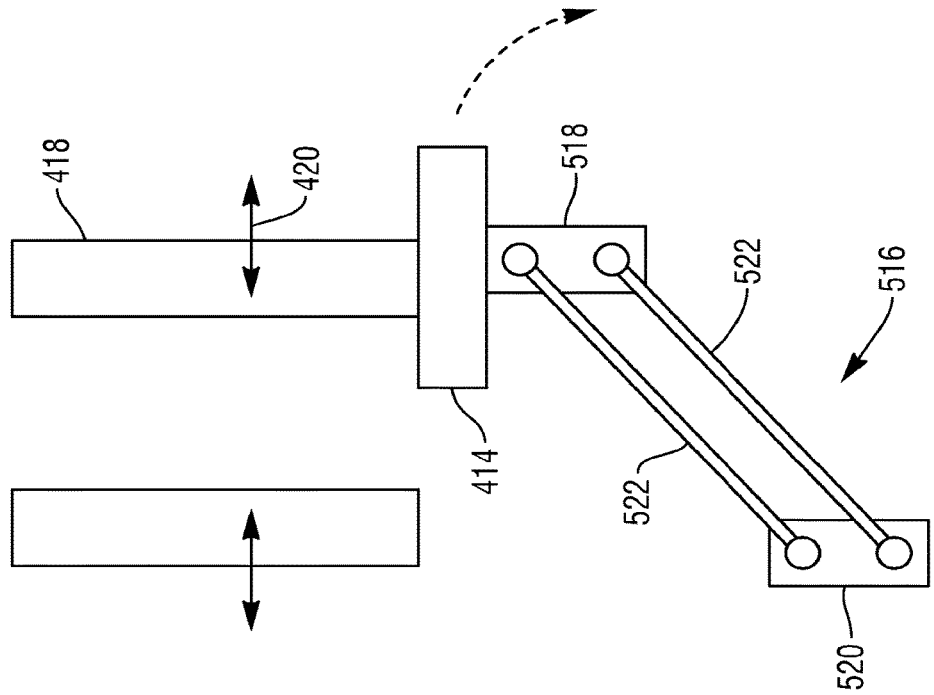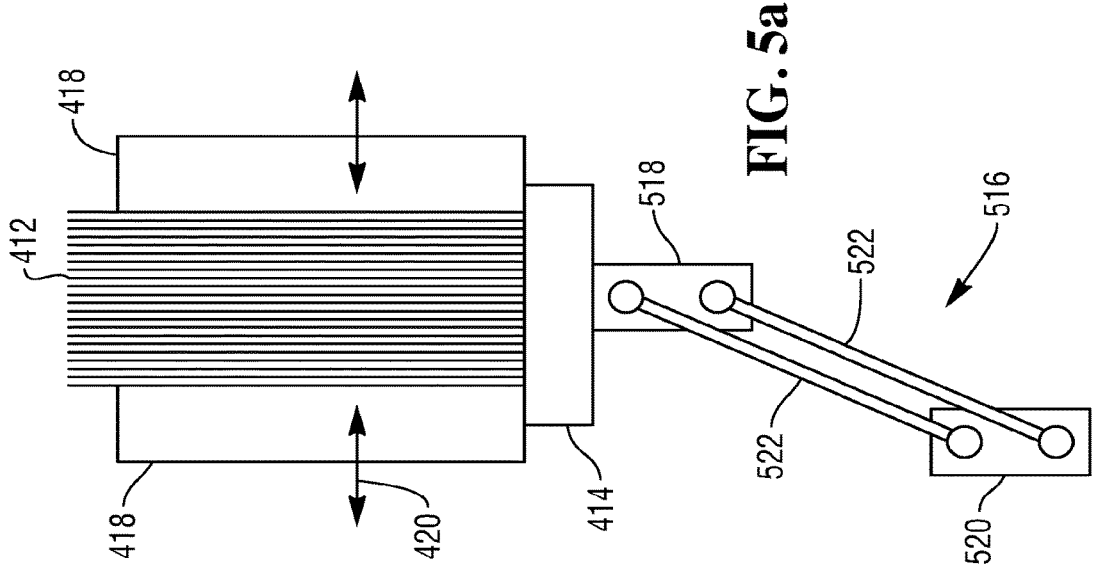

BUNCH PRESENTATION

FIELD OF THE INVENTION

The present invention relates to the presentation of items of media to a user. In particular, but not exclusively, the present invention relates to a method and apparatus for presenting items of media to a user from a media recycler module of a Self Service Terminal (SST) having an open-mouthed pocket type opening into which items of media are deposited and/or from which items of media can be dispensed.

Known SSTs include a media dispenser module which dispenses items of media to a user of the SST. Other known SSTs include a media depositor module which allows users to deposit items of media in the SST. A known type of SST called a 'media recycler' provides a facility for both dispensing and depositing.

Media recyclers receive media deposited by a first user as part of one transaction and then can subsequently dispense the deposited media to another user as part of another transaction. An advantage of such media recyclers is that they reduce the number of media item replenishment operations required, thereby saving money for the owner or operator of the media recycler. Items of media typically include bank notes, checks, stamps, vouchers and coupons, for example.

Media recyclers typically include an open-mouthed pocket from which items of media can be dispensed for a user to access or into which items of media can be deposited by a user. Known pockets must meet certain legislation, such as accessibility requirements, of various countries. For example, the Canadian Standard (CSA, 2009) and Australian Guideline (ABA, 2002) state that a pocket should have a maximum depth of 70 mm. However, some currency notes of other countries, such as Singapore, have a height which exceeds 70 mm which the pocket will not accommodate. Therefore, a specifically sized pocket is required for a particular currency note size and/or to meet national legislation/requirements. This makes such a media recycler only suitable for a particular country and/or maximum currency note size.

Furthermore, a user must reach into a pocket to retrieve dispensed items of media or to deposit items of media therein. However, the items of media are often difficult to see and access from a pocket and it is known that users do not like placing their hands and fingers into dark mechanical pockets.

Furthermore, where a bunch of differently sized media items is dispensed, a user may not see one or more of the smaller items of media in the bunch and may unintentionally leave an item of media in the pocket.

SUMMARY OF THE INVENTION

It is an aim of the present invention to at least partly mitigate the above-mentioned problems.

It is an aim of certain embodiments of the present invention to provide a media recycler module having an open-mouthed pocket which is suitable for a global market.

It is an aim of certain embodiments of the present invention to provide a media recycler module having an open-mouthed pocket which provides a user improved visibility and accessibility to dispensed items of media.

According to a first aspect of the present invention there is provided a method of presenting at least one media item to a user, the method comprising:

receiving at least one media item at a pocket interface of a media recycler module; and moving the at least one media item towards an opening of the pocket interface.

It will be understood that the term "pocket interface" shall be taken to include any suitable recess or compartment of a media recycler module for dispensing/depositing items of media from/into which is oriented vertically, or at an acute angle relative to the vertical, and has a depth relative to an opening thereof.

Aptly, the method further comprises moving the at least one media item to a presentation position in which an upper portion of at least one media item protrudes out of the pocket interface.

Aptly, the method further comprises:

supporting the at least one media item on a support member at a recessed position in the pocket interface of the media recycler module; and moving the support member and supported media item towards the opening of the pocket interface to thereby locate the at least one media item at the presentation position.

Aptly, the method further comprises selectively pinching the at least one media item supported on the support member via at least one clamping member.

Aptly, the method further comprises pinching the at least one media item with the at least one clamping member with a pinch force sufficient to maintain the at least one media item in a fixed position but permit a user to pick the pinched item of media by overcoming the pinch force by hand.

Aptly, the method further comprises raising the at least one media item in a substantially vertical direction from a recessed position to the presentation position.

Aptly, the method further comprises raising the at least one media item from the recessed position to the presentation position by a predetermined distance. Aptly, the predetermined distance is responsive to a height of the at least one media item and/or depth of the pocket interface.

Aptly, the method further comprises locating the at least one media item from the presentation position to the recessed position subsequent to the expiry of a pre-determined period of time.

Aptly, the method further comprises locating the at least one media item from the presentation position to the recessed position subsequent to the occurrence of a pre-determined event.

According to a second aspect of the present invention there is provided a media recycler module comprising:

a pocket interface for presenting media items to a user; and a moveable member operable to move media items located within the pocket interface towards an opening of the pocket interface.

Aptly, the moveable member is operable to locate at least one media item from a recessed position in the pocket interface to a presentation position.

Aptly, an upper portion of at least one clamped media item protrudes out of the pocket interface when in the presentation position.

Aptly, the media recycler module further comprises at least one clamping member operable to apply a pinch force to at least one media item to thereby selectively pinch the at least one media item.

Aptly, the at least one clamping member comprises a pair of opposed pinch plates that selectively clamp at least one media item in a fixed location when the moveable member is in a raised position.

Aptly, the pinch plates exert a pinch force that maintains at least one media item in the fixed position but that can be overcome by a user picking the at least one media item from an open mouth region of the pocket interface. Aptly, the pinch force does not exceed 22N.

Aptly, the moveable member comprises a platform having a support surface that supports at least one media item thereon.

Aptly, the media recycler module further comprises a cam member that is driven against a lower side of the platform and that locates the platform from a raised or lowered position corresponding to the at least one media item being located in the presentation position or recessed position respectively.

Aptly, the media recycler module further comprises:
  a scissor lift comprising a fixed member and at least one arm member coupled to the fixed member and the platform; wherein
  the at least one arm member is selectively driven to locate the platform from a raised or lowered position corresponding to the at least one media item being located in the presentation position or recessed position respectively.

Aptly, the moveable member comprises at least one driven belt or roller.

Aptly, the moveable member comprises a moveable clamp. Aptly, the moveable clamp comprises at least one biased driven roller.

Aptly, the at least one biased driven roller comprises at least one pair of opposed biased driven rollers that are constantly biased towards each other to thereby pinch one or more media items between opposed rollers and locate pinched media items from the recessed position to a presentation position when the rollers are driven.

Aptly, the moveable clamp comprises at least one biased driven belt.

Aptly, the at least one biased driven belt comprises at least one pair of opposed biased driven belts that are constantly biased towards each other to thereby pinch one or more media items between opposed belts and locate pinched media items from the recessed position to a presentation position when the belts are driven.

Aptly, the moveable member is moveable by a pre-determined distance to locate the media items, wherein the pre-determined distance is selectable responsive to a dimension of at least one media item.

Aptly, the pocket interface comprises a base and side walls extending from the base towards an opening of the pocket interface.

Aptly, the pocket interface has a depth from the base to the opening of from about around 70 millimeters to 100 millimeters.

Aptly, the side walls of the recess extend outwardly at a flare angle from the base to define a tapered recess to improve user access and visibility.

Aptly, the base of the pocket interface comprises at least one aperture for the media items to enter and/or leave the pocket interface.

Aptly, the pocket interface is oriented substantially vertically.

Aptly, the pocket interface comprises a closure member to selectively close the opening of the pocket interface. Aptly, the closure member comprises a shutter.

Aptly, the presentation position is located about around 0 degrees to 45 degrees from a vertical position above the recessed position.

Aptly, at least one media item is a currency note and the pocket interface is a dispense/deposit pocket interface of the media recycler module.

According to a third aspect of the present invention there is provided a Self Service Terminal (SST) comprising a media recycler module for presenting at least one item of media to a user, wherein the media recycler module comprises:
  a pocket interface for presenting media items to a user; and
  a moveable member operable to move at least one media item located within the pocket interface towards an opening of the pocket interface.

Aptly, the at least one media item is moved by the moveable member to a presentation position for retrieval by a user.

Aptly, an upper portion of the at least one media item protrudes out of the pocket interface when in the presentation position, thereby enabling a user to retrieve the media items without placing fingers within the pocket interface.

Aptly, the moveable member is operable to apply a pinch force to at least one media item. Aptly, the moveable member comprises a moveable clamp.

According to a fourth aspect of the present invention there is provided a pocket interface for a media recycler module, the pocket interface comprising:
  a media item lifter operable to move at least one media item located in a pocket interface towards an opening of the pocket interface.

Aptly, the at least one media item is moved to a presentation position wherein the at least one media item at least partially protrudes out of the pocket interface.

Aptly, the at least one media item is raised towards the opening of the pocket interface.

According to a fifth aspect of the present invention there is provided a method of presenting at least one media item to a user, the method comprising:
  receiving at least one media item at a pocket interface of a media recycler module; and
  raising the at least one media item so that an upper portion of the at least one media item protrudes out of the pocket interface, thereby enabling a user to retrieve the at least one media item without placing fingers within the pocket interface.

According to a sixth aspect of the present invention there is provided a media recycler module comprising:
  a pocket interface for presenting media items to a user; and
  a moveable clamp operable to clamp media items located within the pocket interface and to raise the clamped media items so that an upper portion of the clamped media items protrudes out of the pocket interface, thereby enabling a user to retrieve the media items without placing fingers within the pocket interface.

According to a seventh aspect of the present invention there is provided a Self Service Terminal (SST) comprising a media recycler module for presenting at least one item of media to a user, wherein the media recycler module comprises:
  a pocket interface for presenting media items to a user; and
  a moveable clamp operable to clamp media items located within the pocket interface and to raise the clamped media items so that an upper portion of the clamped media items protrudes out of the pocket interface, thereby enabling a user to retrieve the media items without placing fingers within the pocket interface.

According to an eighth aspect of the present invention there is provided a pocket interface for a media recycler module, the pocket interface comprising:
   a media item lifter operable to raise media items so that the raised media items protrude at least partially out of the pocket interface. According to a ninth aspect of the present invention there is provided apparatus for presenting at least one item of media to a user, comprising:
   at least one support member that locates one or more items of media from a recessed position in a pocket of a media recycler module to a presentation position in which the items of media are located at an open mouth region associated with an opening of the pocket.

According to a tenth aspect of the present invention there is provided a media recycler module for presenting at least one item of media to a user, wherein the media recycler module comprises:
   at least one support member that locates one or more items of media from a recessed position in a pocket of the media recycler module to a presentation position in which the items of media are located at an open mouth region associated with an opening of the pocket;
   wherein each item of media is a currency note and the pocket comprises a dispense/deposit pocket of the media recycler module.

According to a eleventh aspect of the present invention there is provided a Self Service Terminal (SST) comprising a media recycler module for presenting at least one item of media to a user, wherein the media recycler module comprises:
   at least one support member that locates one or more items of media from a recessed position in a pocket of the media recycler module to a presentation position in which the items of media are located at an open mouth region associated with an opening of the pocket;
   wherein each item of media is a currency note and the pocket comprises a dispense/deposit pocket of the media recycler module.

According to a twelve aspect of the present invention there is provided a method of presenting at least one item of media to a user, comprising:
   supporting one or more items of media on a support member at a recessed position in a pocket of a media recycler module; and
   locating the support member to thereby locate the items of media at a presentation position in which the items of media are located at an open mouth region of the pocket.

According to a thirteenth aspect of the present invention there is provided a method of presenting at least one media item to a user of a media recycler module, comprising:
   moving at least one media item towards an opening in a media recycler module when the media item is to be presented to a user.

Certain embodiments of the present invention provide the advantage that a media recycler module having an open-mouthed pocket interface is suitable for a global market.

Certain embodiments of the present invention provide the advantage that a media recycler module having an open-mouthed pocket interface provides a user with improved visibility and accessibility to dispensed media items.

BRIEF DESCRIPTION OF DRAWINGS

Embodiments of the present invention will now be described hereinafter, by way of example only, with reference to the accompanying drawings in which:

FIGS. 4a and 4b illustrate an embodiment of a lifting mechanism associated with the pocket interface of FIG. 3; and FIGS. 5a and 5b illustrate an alternative embodiment of a lifting mechanism.

DESCRIPTION OF EMBODIMENTS

Figure 1:
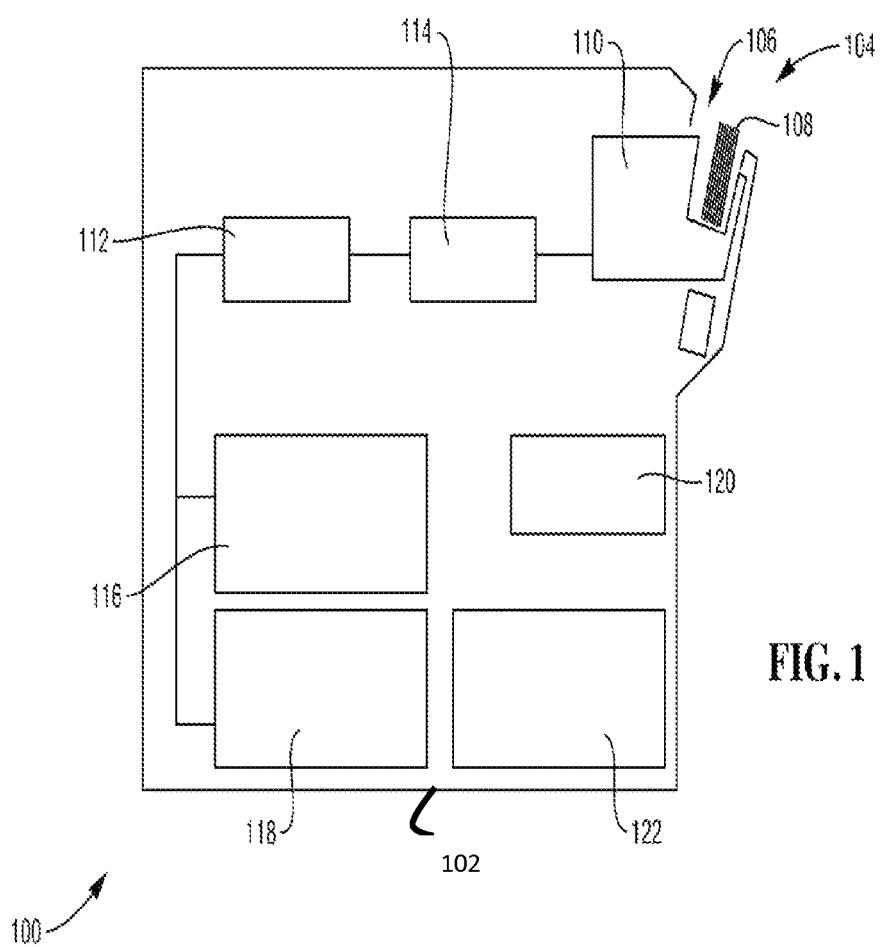
FIG. 1 illustrates a simplified schematic diagram of a media recycler module.

In the drawings like reference numerals refer to like parts.

FIG. 1 is a simplified schematic diagram of a media dispenser/deposit recycler module 100 in the exemplary form of a bunch sheet recycler according to one embodiment of the present invention. The media recycler 100 is operable to receive bunches of currency notes (or an individual currency note) from a first user and to dispense bunches of currency notes (or an individual currency note) to another user.

The recycler module 100 includes a chassis 102 onto which various parts are mounted. The recycler module 100 further comprises a bunch pocket interface 104 having a pocket opening 106 into which a bunch of currency notes 108 can be deposited and from which a bunch of currency notes 108 can be removed as part of a dispense or return operation. The bunch pocket interface 104 is orientated substantially vertically. The bunch pocket interface 104 is orientated at angle of around 30 degrees to the vertical for ease of access by a user and/or for ergonomic/aesthetic purposes.

The recycler module 100 also comprises: a picker/loader 110 for removing and/or delivering one or more currency notes 108 from/to the pocket 104; a currency note validator 112; an escrow 114 for temporarily holding validated currency notes until a user confirms that he/she wants to complete the transaction; at least one currency cassette 116; a purge bin 118; a communications circuit board 120 for communicating with a self-service terminal (not shown) into which the recycler 100 may be installed; a pick/deposit unit (not shown) for removing/loading individual currency notes from/into a respective currency cassette 116; a currency note stacker (not shown) for collating currency notes picked from the currency cassette 116 by the pick/deposit unit; and an on-board controller 122 for controlling the operation of the recycler module 100.

When one or more currency notes are to be dispensed from the cassette 116, each currency note is transported along a pre-determined path. This is implemented by the controller 122 causing the pick/deposit unit to pick the required number of currency notes from the respective currency cassettes 116. The picked currency notes are then collated by the currency note stacker, and then delivered as a bunch to the bunch pick/loader 110 for presenting at the pocket region 104 to a user.

Figure 2:
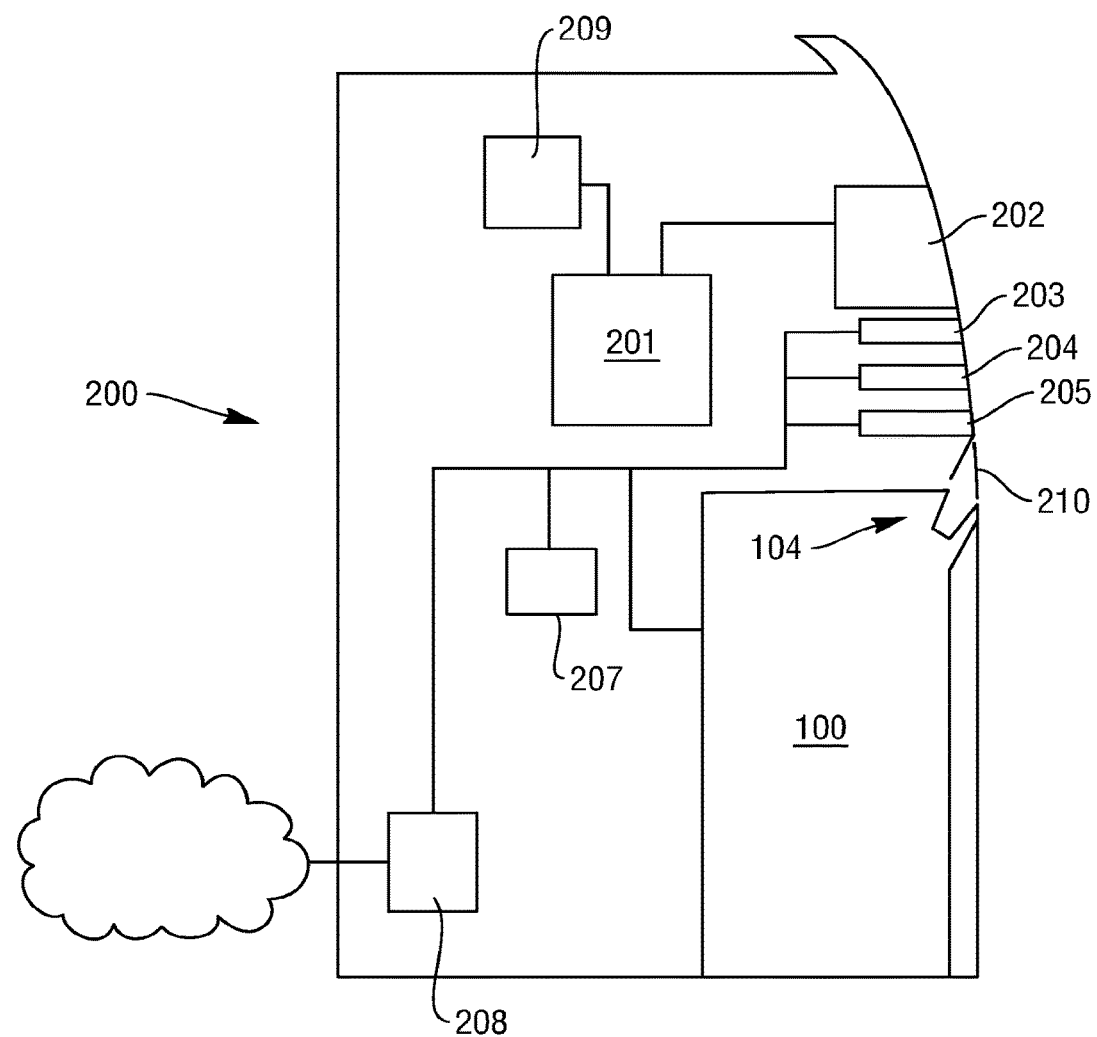
FIG. 2 illustrates a schematic diagram of a Self Service Terminal (SST) in the form of an Automated Teller Machine (ATM) including the media recycler module of FIG. 1.

FIG. 2 illustrates a block diagram of a Self-Service Terminal (SST) 200 in the form of an Automated Teller Machine (ATM) according to one embodiment of the present invention. It will be understood that certain embodiments of the present invention are applicable to other types of terminal such as ATMs, vending machines, Teller Cash Recyclers (TCRs), kiosks, and the like. Likewise, items of media such as, but not limited to, currency notes, checks, tickets, gyros, stamps, lottery tickets, coupons, vouchers, and the like may be deposited at or dispensed from such terminals.

The ATM 200 includes different modules for enabling transactions to be executed and recorded by the ATM 200. These ATM modules include user transaction modules and service personnel modules. The ATM modules include an ATM controller 201, a user display 202, a card reader/writer module 203, an encrypting keypad module 204, a receipt printer module 205, a cash recycler module 100 as shown in FIG. 1, a journal printer module 207 for creating a record of every transaction executed by the ATM, a connection module 208, and an operator panel module 209 for use by a service operator, such as a field engineer, a replenisher (of currency, of printer paper or the like), or the like. The recycler module 100 includes a pocket interface 104 into which a bunch of currency notes can be deposited and from which a bunch of currency notes can be dispensed. An opening of the pocket may be selectively closed by a shutter 210 to prevent unauthorized access into the pocket 104 when not in use and/or to prevent the undesirable ingress of dirt, foreign objects or the like.

Certain user transaction modules (such as the ATM controller 201) are also used by the service personnel for implementing management functions. However, some of the modules are referred to as service personnel modules (such as the journal printer module 207 and the operator panel module 209) because they are never used by ATM users.

Figure 3:
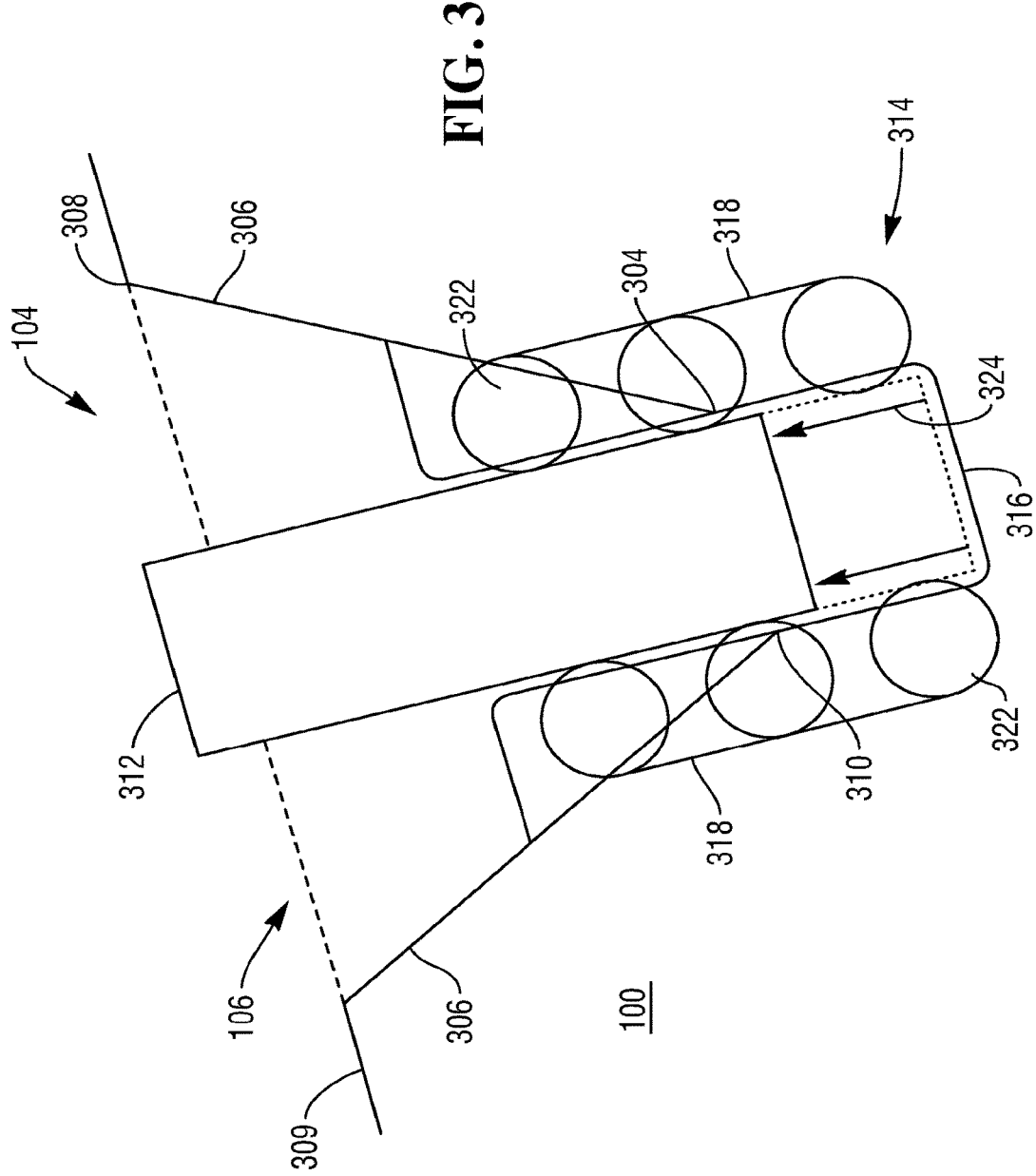
FIG. 3 illustrates a cross section through a pocket interface of the media recycler module of FIG. 1.

FIG. 3 illustrates a bunch sheet recycler 100 having a pocket interface 104 defined by a base 304 and side walls 306. The side walls 306 terminate at edges 308 to define a pocket opening 106. The side walls 306 extend outwardly at a flare angle from the base 304 to define a tapered pocket interface 104 for easy access and visibility for a user. The base 304 of the pocket interface 104 has an aperture 310 for items of media 312 to move through and into the pocket interface 104. A lifting mechanism 314 raises items of media 312 from a recessed position (as shown in dotted line) to a presentation position (as shown in solid line). As shown in FIG. 3, when in the presentation position, the items of media 312 partially extend beyond the opening 106 of the pocket interface 104 to thereby protrude out of the pocket interface 104. Of course, where a bunch of media items comprises small and large items, such as differently sized currency notes, the larger items may protrude beyond an opening of the pocket interface, whereas the smaller items may not. Raising the items of media towards the opening 106 of the pocket interface 104 allows a user to easily see the items of media and remove the same. Raising an item of media beyond the opening allows a user to remove the item(s) without having to place a hand or fingers into the pocket interface 104. However, the items of media may be moved towards the opening 106 of the pocket 104 whilst not extending beyond the opening 106 when in the presentation position. The lifting mechanism 314 is controlled to move at least one item of media 312 from the recessed position to the presentation position by a predetermined distance depending on the height of the item of media and the depth of the pocket interface 104 so that the item of media is moved to at least around the opening 106 of the pocket interface 104 and preferably beyond the opening 106.

A channel 316 is provided below the aperture 310 in the base 304 of the pocket interface 104 into which a bunch of items of media are delivered. The lifting mechanism of FIG. 3 includes opposing belts 318 provided on both sides of the bunch of items of media 312. The belts 318 are supported by respective wheels 322 which are driven by suitable means, such as an electric motor, to move the items of media from the recessed position to the presentation position (as shown by arrows 324), and vice versa. The belts 318 are biased inwardly towards the items of media to grip the same and to prevent slippage when the items of media 312 are being moved. Alternatively, one of the belts 318 may be biased inwardly towards the items of media whilst the other belt may be fixed. Similarly, one of the belts may be driven whilst the other belt may be free to rotate. The belts 318 grip a lower portion of the items of media 312 when the items of media are in the presentation position to prevent the items of media from blowing out of the pocket interface 104 until removed by a user or to allow the items of media to be retracted back into the recycler 100 if the items of media are not removed by a user within a predetermined period of time. Opposing shoulders 320 in a lower portion of the pocket interface 104 help to support and guide the items of media.

FIGS. 4a and 4b show an alternative embodiment of the lifting and pinching mechanisms. The lifting mechanism of FIGS. 4a and 4b includes a platform 414 on which the items of media 412 are supported. The items of media 412 are shown in FIG. 4a as a bunch of items of media which have been delivered on to the platform 414 before being moved with the platform 414 to the presentation position. The platform 414 is moved to and from the presentation position by a cam member 416 which is driven about a cam axis 415 by suitable means, such as an electric motor. FIG. 4b shows the platform 414 and the bunch of items of media 412 in the recessed position.

Opposing pinch plates 418 grip the items of media 412 when in the presentation position until removed by a user and allow the items of media to be retracted back into the recycler if the items of media are not removed by a user within a predetermined period of time. The pinch plates 418 are moveable between deployed and retracted positions (as shown by arrows 420) to engage and disengage with the items of media respectively. Alternatively, a pinch surface, provided for example by a pinch plate, may be moveable towards and away from a fixed surface, provided for example by a fixed plate. One or both plates 418 move away from the items of media 412 towards a retracted position when the platform 414 is in or moving towards the recessed position. One or both plates 418 move to the deployed position to engage with the items of media 412 when the platform 414 is in the presentation position thereby to grip a portion of the items of media 412 until removed by a user and to allow the items of media to be retracted back into the recycler if the items of media are not removed by a user within a predetermined period of time.

The platform 414 includes one or more apertures (now shown), which may take the form of a mesh, slit plate, or the like, to allow foreign objects which have entered the pocket to pass through the platform 414 whilst supporting the items of media 412 thereon. Such foreign objects may include credit/debit cards, coins, paperclips, keys or small stones, or the like. The foreign objects are collected below the platform 414 in a suitable container for later removable by an authorized user.

FIGS. 5a and 5b show an alternative embodiment of the lifting mechanism which includes a four-bar scissor linkage 516 for raising and lowering the platform 414. The linkage includes a moveable upper part 518 coupled to the platform 414 and a fixed lower part 520. A pair of bar links 522 are provided on each side of the mechanism to pivotally couple the moveable and fixed parts together. The moveable part 518 and the platform 414 are able to rotate about the fixed part 520 whilst ensuring the platform 414 remains horizontally orientated, as shown in FIG. 5b. An electric motor (not shown) may drive one or more of the bar links 522 at an end proximal the fixed part 520 to effect such rotation. Such a mechanism allows the platform 414 to move sideways relative to the pocket for access into the pocket by, for example, an authorized user.

It will be understood that other suitable lifting mechanisms may be used to move the items of media from a recessed position to a presentation position.

A controller (not shown) controls the lifting and pinching mechanisms. The items of media are moved a predetermined distance from the recessed position to the presentation position responsive to a height of the items of media and/or national legislation/requirements. For example, a relatively large $10,000 Singapore currency note is 90 mm in height and will require moving to the presentation position by a smaller distance compared to a relatively small 5 Euro currency note having a height of 62 mm. The predetermined distance may be a fixed distance for all types of items of media, such as currency notes, which is a default setting of the controller or which may be selectively input by an authorized user of the recycler. Alternatively, the recycler may include one or more sensors to determine the height of at least one item of media in the pocket and/or the distance from at least one item of media in the pocket to the opening of the pocket before the item of media is moved from a recessed position towards the presentation position by a distance responsive to the sensed data.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of presenting at least one media item to a user, the method comprising:
   receiving at least one media item at a depositor and dispenser pocket interface of a media recycler module at an angle of around 30 degrees to vertical, wherein sidewalls of the depositor and dispenser pocket interface are extended outwardly at a flare angle from a base to define a tapered depositor and dispenser pocket interface, and wherein the depositor and dispenser pocket interface is an interface to the media recycler module and integrated into a Self-Service Terminal for both depositing and dispensing media items; and
   moving the at least one media item towards an opening of the depositor and dispenser pocket interface by activating a cam member to raise a platform having the at least one media item upward towards the opening while opposing pinch plates hold the at least one media item and activating a shutter to close the opening of the depositor and dispenser pocket interface when there is not any of the media items being deposited or dispensed from the depositor and dispenser pocket interface, and permitting foreign objects included with the at least one media item to pass through a slit plate associated with the platform.

2. The me hod as claimed in claim 1, further comprising:
   supporting the at least one media item on a support member at a recessed position in the depositor and dispenser pocket interface of the media recycler module; and
   moving the support member and supported media item towards the opening of the depositor and dispenser pocket interface to thereby locate the at least one media item at a presentation position, wherein the support member is the platform.

3. The method as claimed in claim 2, further comprising selectively pinching the at least one media item supported on the support member via at least one clamping member.

4. The method as claimed in claim 3, further comprising locating the at least one media item from the presentation position to the recessed position subsequent to the occurrence of a pre-determined event.

5. A media recycler module comprising:
   a depositor and dispenser pocket interface configured and adapted to present media items to a user at an angle or around 30 degrees to vertical and the depositor and dispenser pocket interface further adapted and configured to dispense the media items and receive the media items as deposits, wherein the depositor and dispenser pocket interface is an interface to the media recycler module and the media recycler module is integrated into a Self-Service Terminal (SST), wherein sidewalls of the depositor and dispenser pocket interface are extended outwardly at a flare angle from a base to define a tapered depositor and dispenser pocket interface; and
   a moveable member configured and adapted to move media items located within the depositor and dispenser pocket interface towards an opening of the depositor and dispenser pocket interface, wherein the moveable member includes a platform for holding the media items and a pair of bar links, each bar link proximally coupled to a moveable upper part and a fixed lower part with the moveable upper part including the platform, and when the pair of bar links are rotated from the fixed lower part, the moveable upper part and platform are urged downward and sideways towards or away from the opening while the platform remains horizontally oriented.

6. The media recycler module as claimed in claim 5, further comprising a clamping member operable to apply a pinch force to the at least one media item to thereby selectively pinch the at least one media item.

7. The media recycler module as claimed in claim 6, wherein the clamping member comprises a pair of opposed pinch plates that selectively clamp items of media in a fixed location at least when the moveable member is in a raised position.

8. The media recycler module as claimed in claim 5, wherein the moveable member is moveable by a pre-determined distance from a recessed position to a presentation position, wherein the pre-determined distance is selectable responsive to a dimension of at least one media item.

9. The media recycler module as claimed in claim 5, wherein the depositor and dispenser pocket interface comprises the base and the side walls extending from the base towards an opening of the depositor and dispenser pocket interface.

10. The media recycler module as claimed in claim 9, wherein the depositor and dispenser pocket interface has a depth from the base to the opening of from about around 70 millimeters to 100 millimeters.

11. A Self-Service Terminal (SST) comprising a media recycler module as claimed in claim 5.

12. A depositor and dispenser pocket interface for a media recycler module, the depositor and dispenser pocket interface comprising:

a media item lifter configured and adapted to move at least one media item located in the depositor and dispenser pocket interface towards an opening of the depositor and dispenser pocket interface, and an opening configured and adapted to receive the media item oriented at around 30 degrees to vertical to provide access to a user, and wherein sidewalls of the depositor and dispenser pocket interface are extended outwardly at a flare angle from a base to define a tapered depositor and dispenser pocket interface, and wherein the depositor and dispenser pocket interface is an interface to the media recycler module, wherein the media recycler module is integrated into a Self-Service Terminal, and wherein the media item lifter includes a platform for holding the media items and a pair of bar links, each bar link proximally coupled to a moveable upper part and a fixed lower part with the moveable upper part including the platform, and when the pair of bar links are rotated from the fixed lower part, the moveable upper part and platform are urged downward and sideways towards or away from the opening while the platform remains horizontally oriented.

\* \* \* \* \*